May 31, 1966     L. C. PARKER     3,253,772

IDLE SPEED CONTROL

Filed Dec. 13, 1963

INVENTOR.
Leland C. Parker
BY J. L. Carpenter
ATTORNEY

United States Patent Office 3,253,772
Patented May 31, 1966

3,253,772
IDLE SPEED CONTROL
Leland C. Parker, Rochester, N.Y., assignor to General Motors Corporation, Detroit, Mich., a corporation of Delaware
Filed Dec. 13, 1963, Ser. No. 330,490
6 Claims. (Cl. 230—9)

This invention relates to a magnetic actuator particularly useful in a mechanism for opening the throttle valve of the engine of an air conditioned vehicle to compensate for the additional load placed on the engine by the air conditioning system.

It has become common to equip air conditioned vehicles with means for opening the throttle valve slightly from its idling position when the air conditioning system is in operation. The provision of such means accomplishes two results: first, it prevents the engine from stalling due to the additional load placed thereon by the air conditioning system; and second, it makes sufficient power available when the engine is idling to run the air conditioning system so that adequate cooling of the vehicle is obtained.

The present invention provides a novel mechanism which will open tht throttle valve in response to operation of the air conditioning system. A plunger secured to a diaphragm is connected to the throttle valve. The diaphragm and plunger are spring biased so as to open the throttle valve. Manifold vacuum is applied against the diaphragm in opposition to the spring bias so that normally the throttle valve is permitted to close. However, when the air conditioning system is turned on, an inlet admits air against the diaphragm to reduce the vacuum so that the diaphragm and plunger open the throttle valve.

Controlling the inlet is a valve mounted adjacent the housing of the air conditioning compressor. The valve is secured to a resilient steel spring which holds the valve against the seat, preventing the admission of atmosphere through the inlet. The compressor is driven through a magnetic clutch from which emanates stray magnetic force during operation of the air conditioning system. The spring, being of a magnetic material, responds to the stray magnetic force, unseating the valve and admitting atmosphere through the inlet against the diaphragm. The throttle valve is thus opened in response to operation of the air conditioning system.

The details as well as other objects and advantages of the present invention appear in the accompanying description and the drawing, in which.

Figure 1:
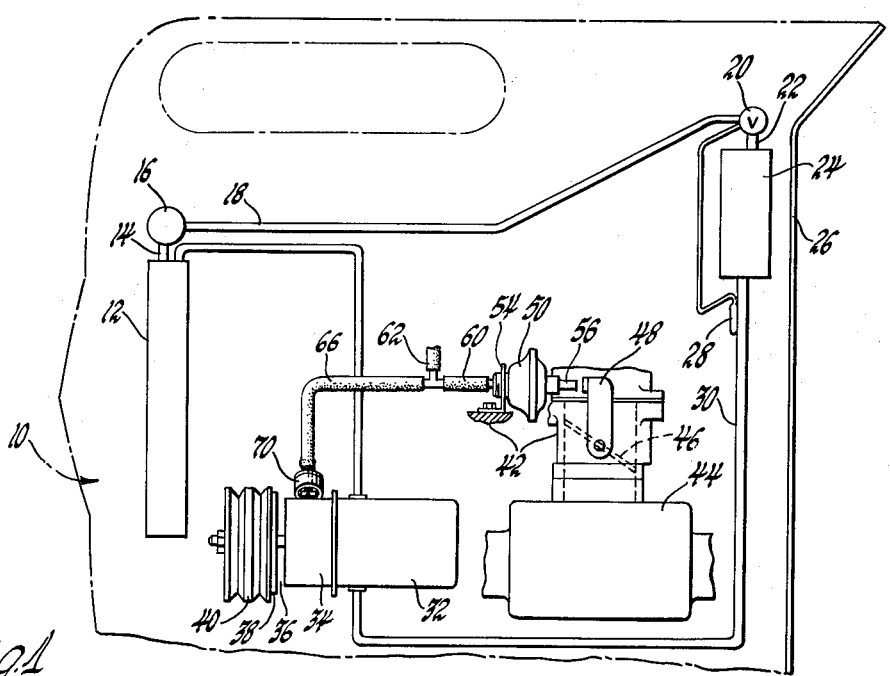
FIGURE 1 is a schematic view of a vehicle engine compartment within which are located an air conditioning system, a carburetor, and the throttle actuating mechanism mounted thereon.

Referring first to FIGURE 1, a vehicle engine compartment is indicated generally at 10. Within compartment 10 an air conditioning system is arranged in the customary manner. A condenser 12 is located in front of the radiator (not shown). From condenser 12 the refrigerant flows through a conduit 14 to a receiver 16, then through a conduit 18, an expansion valve 20, and a conduit 22 to an evaporator 24. Evaporator 24 is located immediately in front of the fire wall 26 which separates engine compartment 10 from the passenger compartment (not shown). Expansion valve 20 is controlled by a thermostatic bulb 28 located in heat exchange relationship with a conduit 30 through which the refrigerant flows from the discharge side of evaporator 24 to a compressor 32.

When the air conditioning system is turned on, a winding 33 (FIGURE 3) in the housing 34 of compressor 32 is energized, creating a magnetic field across a gap 36 between compressor 32 and a clutch plate 38. Clutch plate 38 is thereby magnetically coupled to compressor 32. Clutch plate 38, and thus compressor 32, is driven by the crankshaft of the engine (not shown) through a pulley 40.

Also within compartment 10, the carburetor 42 is mounted upon the intake manifold 44 of the engine. Within carburetor 42 is a throttle valve 46 which, as is well known, controls the amount of fuel flowing to the engine and thus controls the speed of the engine. A throttle lever 48 controls throttle valve 46.

Figures 2, 3:
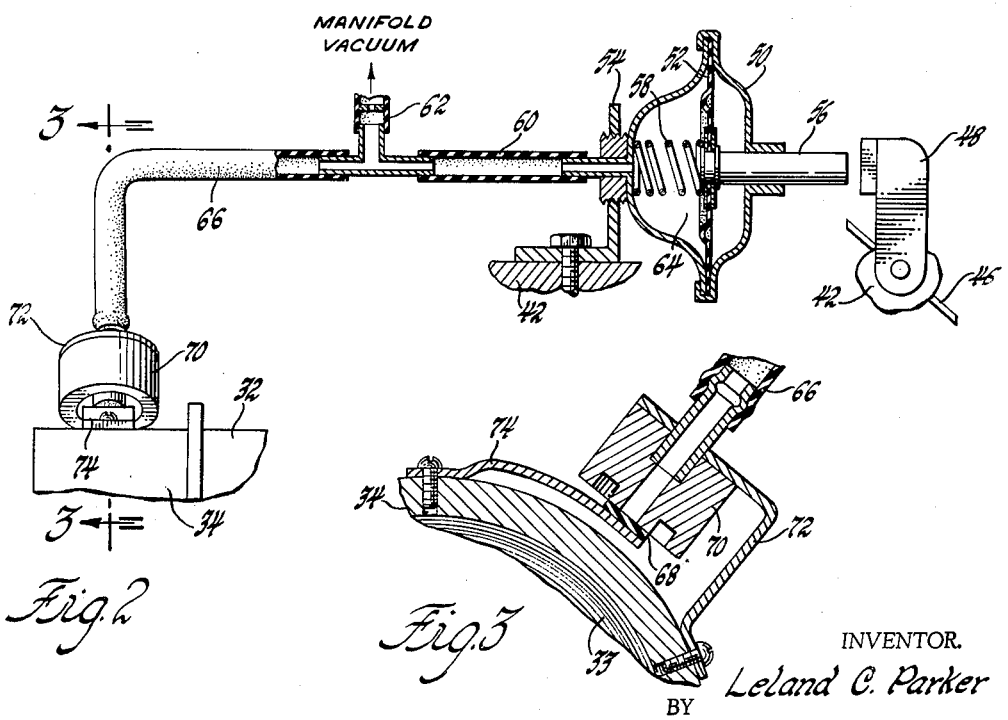
FIGURE 2 is an enlarged view of the throttle actuating mechanism, partially in section with parts broken away.
FIGURE 3 is a sectional view taken along line 3—3 of FIGURE 2.

As shown more clearly in FIGURE 2, a housing 50 in which is secured a flexible diaphragm 52 is mounted by a bracket 54 on carburetor 42. A plunger 56 is secured to diaphragm 52. Diaphragm 52 and plunger 56 are biased by a spring 58 so that plunger 56 bears against lever 48 and opens throttle valve 46.

Through conduits 60 and 62 manifold vacuum is conducted to a chamber 64 behind diaphragm 52, acting on diaphragm 52 against the force of spring 58. Spring 58 is weak enough to be overcome by normal values of manifold vacuum, allowing diaphragm 52 and plunger 56 to be drawn back and throttle valve 46 to be closed.

Through conduits 66 and 60 atmosphere may be admitted to chamber 64, reducing the vacuum therein below normal values of manifold vacuum. Diaphragm 52 and plunger 56, biased by spring 58, then open throttle valve 46.

As shown in FIGURE 3, the admission of atmosphere through conduit 66 is controlled by a rubber stopper valve 68 which seats on a member 70. Member 70 is supported by a bracket 72 secured to housing 34 of compressor 32. Valve 68 is secured to one end of a resilient steel spring 74, the other end of which is secured to housing 34.

Spring 74 is magnetically responsive. When the air conditioning system is turned on, stray magnetic force emanating from the magnetic clutch crosses housing 34 perpendicular to the surface thereof. Spring 74 is magnetically attracted toward the compressor and unseats valve 68. Atmosphere then passes through conduit 66 to chamber 74, reducing the vacuum therein. Diaphragm 52 and plunger 56 open throttle valve 46.

When the air conditioning system is turned off and the stray magnetic force decays, the resilience of spring 74 causes it to return to the position shown. Valve 68 closes conduit 66, allowing manifold vacuum to build up in chamber 64. Diaphragm 52 and plunger 56 are drawn back, permitting throttle valve 46 to close.

It will be appreciated that the principle involved in the control of valve 68 by spring 74 is not limited in application to the specific embodiment shown. Many devices, including other pneumatic or hydraulic valves or electrical contact switches, for example, might be constructed to actuate sequentially upon operation of a magnetically operated system by including in the device a member biased toward one position and responsive to stray magnetic force emanating from the system so as to move from that position and actuate the device.

It will also be appreciated that diaphragm 52 acts as a standard throttle valve return check when the air conditioning system is not in operation. A sudden closure of throttle valve 46 is prevented by plunger 56 bearing against lever 48. As manifold vacuum gradually increases, diaphragm 52 and plunger 56 are drawn back against spring 58 allowing throttle valve 46 to close slowly.

It will be further appreciated that the system described hereinafter may be combined with that shown in my copending application, Serial No. 282,748, now Patent 3,176,459. The functions of throttle return check, air conditioning load compensator, and power steering load compensator will then be served in a simple, efficient, inexpensive, but effective manner.

I claim:

1. In an air conditioned, engine driven vehicle, an engine driven compressor for the air conditioning system, said compressor including a magnetic clutch having a winding which upon energization creates a magnetic field causing said clutch to drivingly couple said compressor to the engine of the vehicle, a throttle valve controlling the engine of the vehicle, a stop controlling the closed position of said throttle valve, and magnetically operated means adapted to position said stop to prevent complete closure of said throttle valve in response to the magnetic field created by said winding.

2. In an air conditioned, engine driven vehicle; an engine driven compressor for the air conditioning system, said compressor including a magnetic clutch having a winding which upon energization creates a magnetic field causing said clutch to drivingly couple said compressor to the engine of the vehicle; a throttle valve controlling the engine of the vehicle; a return check delaying closure of said throttle valve comprising pressure responsive means biased into connection with said throttle valve to prevent complete closure thereof, a restricted conduit through which to apply engine vacuum against said pressure responsive means to gradually move said pressure responsive means out of connection with said throttle valve permitting slow closure thereof, and an air bleed through which to apply atmosphere against said pressure responsive means to reduce the engine vacuum and move said pressure responsive means into connection with said throttle valve preventing closure thereof; and means controlling said air bleed comprising a valve closing said air bleed and a magnetically responsive member connected to said valve to open said air bleed under the influence of the magnetic field created by said winding.

3. A throttle actuator adapted to compensate for the additional load placed by a magnetically operated air conditioning compressor on a vehicle engine which has a throttle valve, said actuator comprising a pressure responsive member, means adapted to apply pressure against said member, said member being connectable to said throttle valve so as to operate said throttle valve in response to a change in the pressure, and a magnetically operated valve adapted to change the pressure applied against said member and open said throttle valve in response to stray magnetic force emanating from said compressor.

4. A mechanism adapted to compensate for the additional load placed by an air conditioning compressor having a magnetic clutch on a vehicle engine which has a throttle valve, said mechanism comprising a pressure responsive diaphragm connectable to said throttle valve, means biasing said diaphragm in a throttle valve opening direction, a conduit through which manifold vacuum is applied against said diaphragm in a throttle valve closing direction, an inlet through which atmosphere may be applied against said diaphragm in a throttle valve opening direction, a stopper valve closing said inlet, and a magnetically responsive resilient spring controlling said stopper valve, said spring being adapted to open said stopper valve in response to stray magnetic force emanating from said clutch, said spring resiliently closing said stopper valve when said spring is not under the influence of a magnetic field.

5. In an automotive vehicle, an internal combustion engine, an air conditioning system including a compressor, said compressor having a magnetic clutch including a winding which upon energization creates a magnetic field causing said clutch to drivingly couple said compressor to said engine, and an idle speed control for said engine comprising magnetically responsive means energized by the magnetic field created by said winding and adapted upon energization to increase the engine idle speed.

6. The combination of claim 5 wherein said magnetically responsive means is energized by stray magnetic force emanated from said magnetic clutch.

References Cited by the Examiner

UNITED STATES PATENTS

| | | | |
|---|---|---|---|
| 1,119,660 | 12/1914 | Stevens | 200—103 |
| 1,814,577 | 8/1931 | Windle | 251—30 X |
| 2,023,418 | 12/1935 | Gustafson | 251—30 X |
| 2,286,758 | 6/1942 | Nelson | 230—5 |
| 2,454,073 | 11/1948 | Mallory | 230—9 |
| 2,639,083 | 5/1953 | Rambo | 230—15 |
| 2,720,087 | 10/1955 | Groene | 230—3 |
| 2,972,465 | 2/1961 | Ray | 251—30 |
| 3,140,727 | 7/1964 | Cutler | 251—141 |

MARK NEWMAN, *Primary Examiner.*

DONLEY J. STOCKING, SAMUEL LEVINE,
*Examiners.*

W. L. FREEH, *Assistant Examiner.*